United States Patent [19]

Tugwell

[11] Patent Number: 5,432,434
[45] Date of Patent: Jul. 11, 1995

[54] SYSTEM FOR MATCHING A NEW HOLE IN AN OVERLYING MEMBER WITH AN EXISTING HOLE IN AN UNDERLYING MEMBER

[75] Inventor: Robert B. Tugwell, Gallatin, Tenn.

[73] Assignee: Avco Corporation, Providence, R.I.

[21] Appl. No.: 76,805

[22] Filed: Jun. 14, 1993

[51] Int. Cl.⁶ .................. G01R 19/00; G01R 33/00
[52] U.S. Cl. ............................. 324/67; 324/226
[58] Field of Search .......... 324/67, 226, 228, 262

[56] References Cited

U.S. PATENT DOCUMENTS

| | | | |
|---|---|---|---|
| 2,318,191 | 5/1943 | Bloomfield | 78/46 |
| 2,346,773 | 4/1944 | McBride et al. | 324/67 |
| 2,600,857 | 6/1952 | De La Mater | 324/67 |
| 2,834,938 | 5/1958 | Cunningham | 324/34 |
| 2,844,977 | 7/1958 | Morse | 324/67 |
| 2,933,679 | 4/1960 | Bray | 324/41 |
| 3,722,360 | 3/1973 | Blakey et al. | 90/11 C |
| 3,793,738 | 2/1974 | Blakey | 33/180 R |
| 4,384,396 | 5/1983 | Smolik | 29/407 |
| 4,388,890 | 6/1983 | Wester et al. | 116/204 |
| 4,741,534 | 5/1988 | Rogahn | 273/157 R |

*Primary Examiner*—Walter E. Snow
*Attorney, Agent, or Firm*—Perman & Green

[57] ABSTRACT

A system is provided for matching a new hole in an overlying member with an existing hole in an underlying member. With a magnet placed in the existing hole, an indicator device having an internal cavity, an outer boundary, and a ferrous ball freely movable within the internal cavity is slid across the surface of the overlying member and in engagement therewith. When the ferrous ball overlies the magnet, a position on the overlying member aligned with the existing hole in the underlying member is thereby located. Thereafter, the indicator means is removed from the overlying member and replaced by a drill guide means. The drill guide means is used to locate a drill to cut a hole through the overlying member coincident with the existing hole in the underlying member.

7 Claims, 2 Drawing Sheets

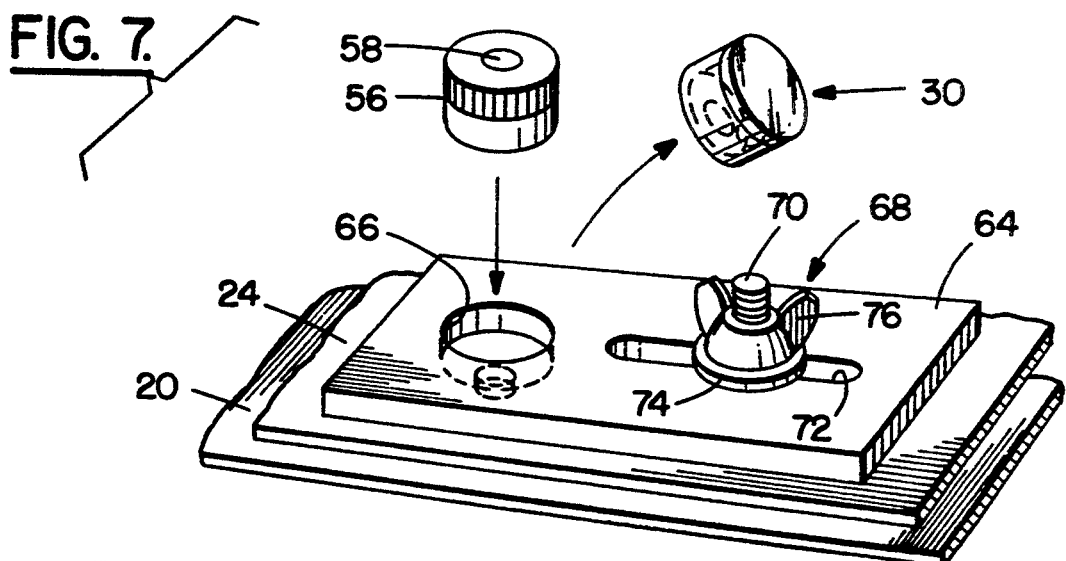
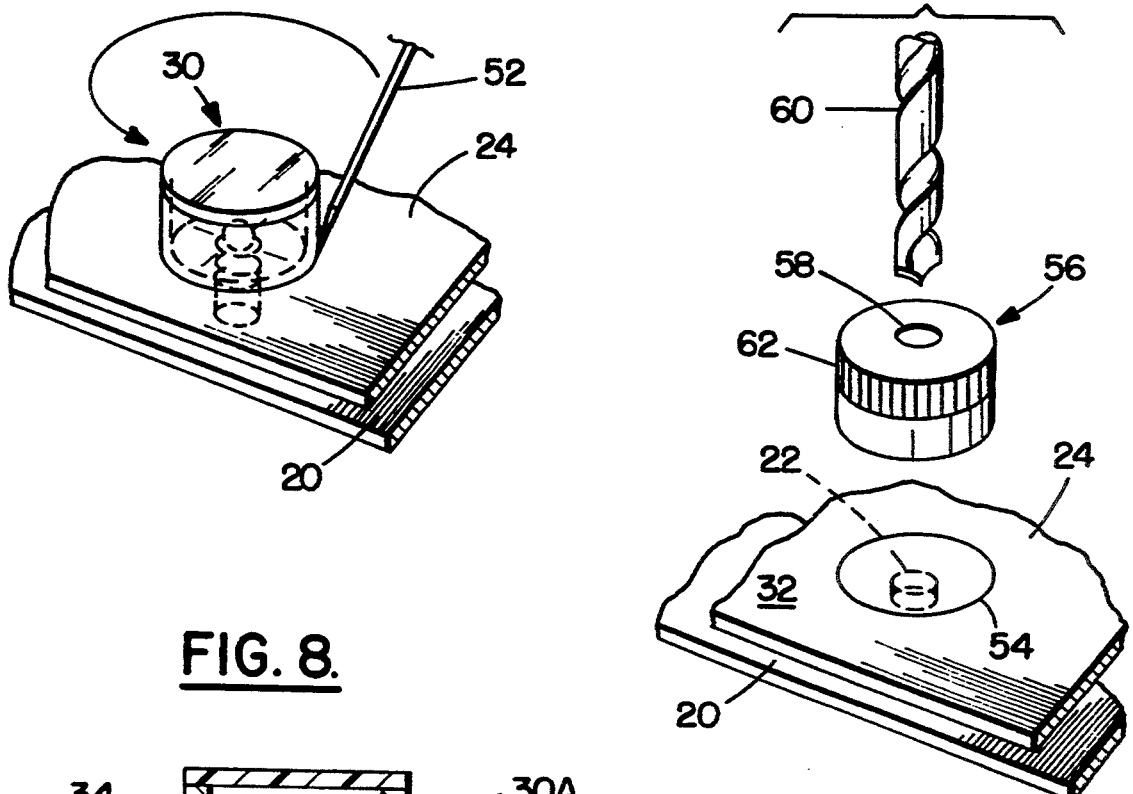
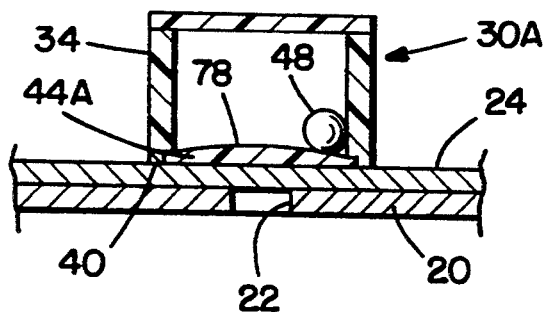

SYSTEM FOR MATCHING A NEW HOLE IN AN OVERLYING MEMBER WITH AN EXISTING HOLE IN AN UNDERLYING MEMBER

BACKGROUND OF THE INVENTION

I. Field of the Invention

The present invention relates to a system for locating a hole in an underlying member to enable an aligned hole to be drilled into an overlying member from the side of the overlying member.

In some manufacturing processes it is customary to locate and drill fastening holes in a major component, then position a minor component over the hole so as to drill a mating hole in the minor component. However, in some instances, after the fastening holes are drilled in the major component, it assumes a position, beneficial for other reasons, which prevents the use of drill in a manner in which the existing hole could serve as a guide to drill the mating hole in the minor component. This situation requires that the hole be drilled from the side of the minor component which overlies, and therefore hides, the hole in the major component.

II. Description of the Prior Art

There is substantial evidence in the prior art of attempts to perform operations on one side of an opaque barrier which are necessarily dependent upon the position of an object behind that barrier. For example, in the patent to Bloomfield, U.S. Pat. No. 2,318,191, electromagnets are used to position and maintain a pair of objects in an aligned fashion on opposite sides of sheet material so that they can be riveted together to form a unitary structure.

U.S. Pat. No. 2,933,679 to Bray discloses a well known stud finder device which utilizes an elongated magnet which is permitted to pivot as its casing is drawn across a wall, the magnet being attracted to the head of nails which have been driven into studs to which the sheet rock is attached.

In the patent to Cunningham, U.S. Pat. No. 2,834,938, a ball on one side of a wall of varying thickness is attracted to a magnet on the opposite side of the wall. As the magnet is drawn along the wall, the ball moves with it and an ammeter of an associated electrical circuit provides a reading which is proportional to the thickness of the wall.

Another disclosure involving metal balls is presented in U.S. Pat. No. 4,741,534 to Rogahn. In this instance, each ball is placed in a spherical chamber within a cube and attracted to a magnetic base. Multiple blocks are thereby mounted on the base to form a picture puzzle or the like.

In U.S. Pat. No. 3,793,738 to Blakey and in U.S. Pat. No. 3,722,360 to Blakey et al., magnets are used for locating and positioning a part on a surface plate and enabling the replacement of the part with another part of the same configuration.

In U.S. Pat. No. 4,384,396 to Smolik, the position of an electrical receptacle box behind a wall is determined, then an opening cut in the wall to enable a cover to be subsequently placed over the opening into the receptacle box.

In U.S. Pat. No. 4,388,890 to Wester et al., a magnet temporarily mounted on one side of a wall serves to attract another magnet with a drill guide therein positioned on the opposite side of the wall. When the two magnets are aligned, which can only be achieved on a trial and error basis, and not with any visual assurance, a hole is then drilled into the wall using the hole in the guide.

It was in light of the prior art, typical examples of which have just been described, that the present invention was conceived and has now been reduced to practice.

SUMMARY OF THE INVENTION

According to the invention, a system is provided for matching a new hole in an overlying member with an existing hole in an underlying member. With a magnet placed in the existing hole, an indicator device having an internal cavity, an outer boundary, and a ferrous ball freely movable within the internal cavity is slid across the surface of the overlying member and in engagement therewith. When the ferrous ball overlies the magnet, a position on the overlying member aligned with the existing hole in the underlying member is thereby located. Thereafter, the indicator means is removed from the overlying member and replaced by a drill guide means. The drill guide means is used to locate a drill to cut a hole through the overlying member coincident with the existing hole in the underlying member.

An object, then, of the invention is to provide a system for matching a new hole in an overlying member with an existing hole in an underlying member.

Another object of the invention is to provide such a system which clearly indicates when the underlying hole has not been located as well as when it has been located.

Still another object of the invention is to provide such a system in which a sensor unit and a drill bushing are of substantially identical size such that an outline marked on the outer surface of the overlying member when the magnetic sensor has located the existing hole can serve to position the drill bushing to insure that the new hole to be drilled will be perfectly aligned with the existing hole.

Still another object of the invention is to provide such a system which utilizes inexpensive materials and can be readily manufactured and easily used.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate some of the embodiments of the invention and, together with the description, serve to explain the principles of the invention in general terms. Like numerals refer to like parts throughout the disclosure.

BRIEF DESCRIPTION OF THE DRAWINGS

FIG. 4 is a detail perspective view illustrating a step in the method of the invention;

FIG. 5 is an exploded perspective view illustrating a subsequent step in the method of the invention;

FIGS. 6 and 7 are detail perspective views illustrating successive steps used with another embodiment of the invention; and FIG. 8 is a cross section view, similar to FIG. 2, illustrating yet another embodiment of the invention.

DETAILED DESCRIPTION OF THE PREFERRED EMBODIMENTS

Figure 1:
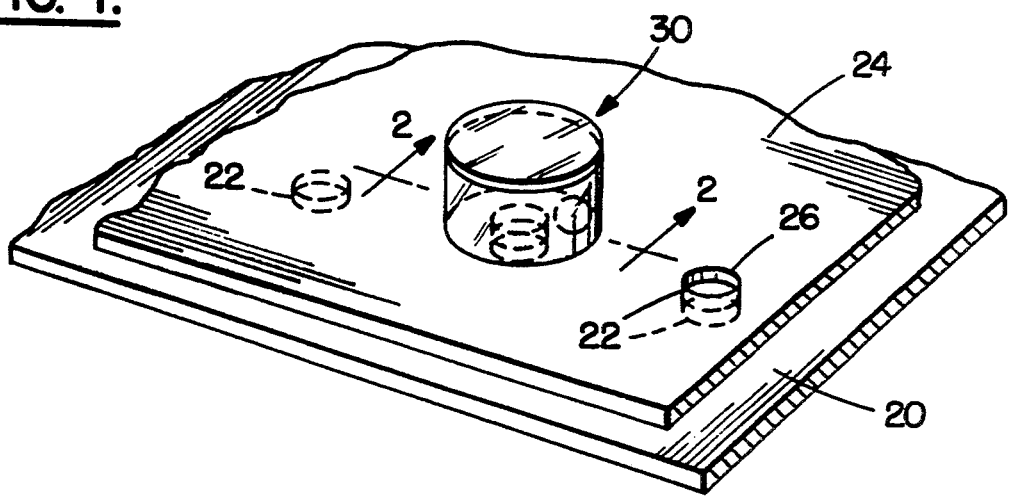
FIG. 1 is a detail perspective view generally illustrating the operation of a sensor system of the invention.

Turn now to the drawings and, initially, to FIG. 1 which is generally illustrative of the problem encountered, then solved, by the present invention. As depicted in FIG. 1, an underlying member 20 is already provided with existing holes 22. In an assembly operation, it is desired to drill in an overlying member 24, in contiguous relationship with the underlying member 20, new holes 26 which match, that is, are aligned with, the existing holes. While the members 20 and 24 are depicted as being of sheet material, that need not be the case for purposes of the present invention.

In order to locate and drill the new hole 26 so as to be perfectly aligned with the existing hole 22, a sensor 28 is utilized. In a first operation, a cylindrical magnet 29, which may be composed of a rare earth or alnico, for example, is inserted into the existing hole 22 of the underlying member 20. An indicator device 30 is then drawn across a surface 32 of the overlying member 24, either in engagement with the surface or in close proximity thereto, in an attempt to locate the position of the magnet 29. The indicator device 30 has a cylindrical wall 34, preferably of non-metallic material, and the wall has an outer peripheral surface 36.

The cylindrical wall 34 also has an upper rim 38 and a lower rim 40. A transparent upper plate 42 is suitably joined to the cylindrical wall 34 at the upper rim 38 and a lower plate 44, which need not be transparent, is joined to the cylindrical wall 34 adjacent the lower rim 40.

The construction of the cylindrical wall 34, and the upper and lower plates 42, 44 defines an internal cavity 46 within which is captured a ferrous ball 48 which is freely movable within the confines of the cavity.

Figure 2A:
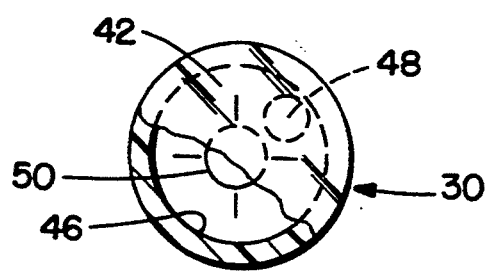
FIG. 2A is a top plan view of a portion of FIG. 2, certain parts being cut away for clarity.
Figure 3A:
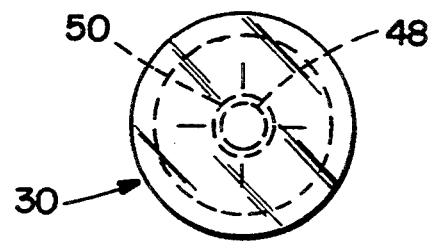
FIG. 3A, similar to FIG. 2A, is a top plan view of a portion of FIG. 3.
Figure 2:
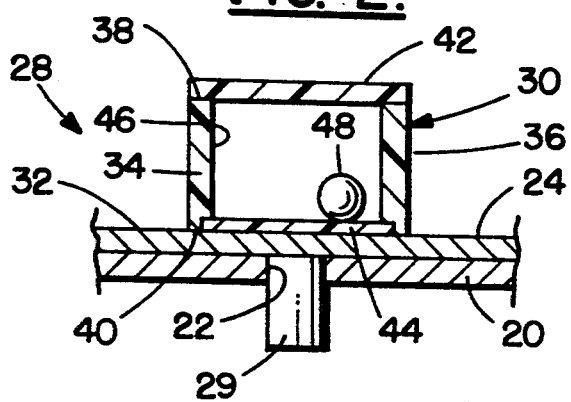
FIG. 2 is a detail cross-section view, in elevation, taken generally along lines 2—2 in FIG. 1, illustrating the indicator device of the invention before it has located the existing hole.
Figure 3:
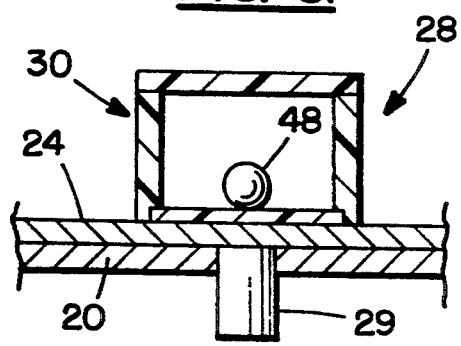
FIG. 3 is a cross-section view, similar to FIG. 2, illustrating the indicator device of the invention when it has located the existing hole.

As the indicator device 30 is drawn across the surface 32, the ferrous ball 48 rolls randomly on the lower plate 44 as indicated in FIGS. 2 and 2A. However, when the indicator device 30 moves into the proximity of the magnet 29, the ferrous ball 48 is strongly drawn by magnetic attraction into alignment with the magnet as seen in FIGS. 3 and 3A.

A centralized marker 50, i.e., a target or bull's eye, is suitably formed on an upper surface of the lower plate 44 to indicate a location within the internal cavity 46 which is substantially equidistant from all locations of the cylindrical wall 34. However, it is important that the marker 50 does not interfere with the movement of the ferrous ball. It may be, for example, an outline substantially equivalent to a circumference of the ferrous ball 48 when it is centrally located within the cavity at a position equidistant from all locations of the cylindrical wall. In this manner, a viewer looking down onto the indicator device 30, in a manner as illustrated in FIG. 3A, would then see the ball 48 centrally positioned within the marker 50 when the ball is aligned with the cylindrical magnet 29.

It may then be desirable mark the position of the indicator device 30 in the manner illustrated in FIG. 4. More specifically, a scribing instrument 52 may then be utilized to scribe the surface 32 of the member 24 at the intersection of the outer peripheral surface 36 with the surface 32. The scribing instrument 52 may be, for example, a pencil or a pointed auger, or other suitable marking device.

After a proper outline 54 of the outer peripheral surface 36 has been thereby formed on the surface 32 of the overlying member 24, the indicator device 30 is removed from the overlying member and set aside. Thereupon, as seen in FIG. 5, a drill guide 56 is placed into engagement with the surface 32 of the overlying member 24 so that its outer peripheral surface is coincident with the scribed outline 54. It will be appreciated that, for purposes of the invention, the drill guide 56 is cylindrical and has a diameter which is substantially identical to that of the indicator device 30. Additionally, the drill guide 56 has a central bore 58 which is just slightly oversized in respect to a drill 60 intended to form a new hole 26 perfectly aligned with the existing hole 22 and having the same diameter as the existing hole.

The drill guide 56 may be manually held against the surface 32. To aid in this regard, at least a portion of the peripheral surface of the drill guide 56 may be knurled as indicated at 62.

Figure 6:
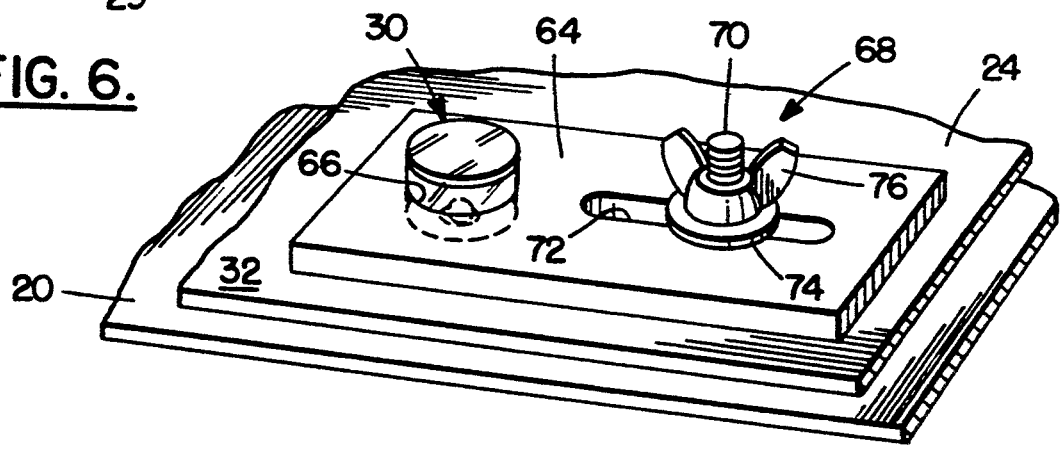

However, positioning the drill guide 56 may be accomplished in a somewhat different, and preferred, manner than that just described. For this preferred manner of operation, turn now to FIGS. 6 and 7. First, viewing FIG. 6, the indicator device 30 is positioned initially in a manner previously described with regard to FIGS. 3 and 3A. Thereupon, a drill plate 64 with an aperture 66 therethrough similarly sized to the indicator device 30 is placed in engagement with the surface 32 of the overlying member 24 and is then secured to the overlying member. This may be accomplished by means of a temporary fastener assembly 68. For example, the fastener assembly 68 may comprise a temporary bolt 70 extending through the earlier formed holes 22, 26 and the members 20, 24, then through an oversized elongated slot 72 in the drill plate 64 and tightened down with the aid of a washer 74 and wing nut 76. Alternatively, the drill plate 62 may be held manually or may be suitably clamped in place. In any event, the aperture 66 is slidably received over the indicator device 30 after which the drill plate 62 is firmly attached to the overlying member 24.

Thereupon, viewing FIG. 7, the indicator device 30 is removed from the aperture 66 and replaced with the drill guide 56 which then serves in the fashion previously described with the aid of FIG. 5. After the new hole 26 is thereby drilled, the fastener assembly 68 is unfastened and the drill plate 64 is moved to a new location after the indicator device 30 has satisfactorily located the next existing hole being sought.

Another embodiment of the invention is illustrated in FIG. 8. In this instance, a modified indicator device 30A is depicted which as a lower plate 44A, similar to lower plate 44 of indicator device 30, except that it has an upper surface 78 which is crowned such that its central regions are elevated above its peripheral regions. In this manner, the ferrous ball 48 is urged toward the cylindrical wall 34 when the lower rim 40 lies substantially in a horizontal plane. In this manner, the ball 48 is normally urged away from its central position so that a user can more readily identify when the magnet 29 is effective to draw the ball 48 to the centralized position as illustrated in FIGS. 3 and 3A. There is a greater chance of the ferrous ball drifting off center if the bottom plate is crowned that it would if it is flat. The thickness of the overlying member would also be a factor.

While preferred embodiments of the invention have been disclosed in detail, it should be understood by those skilled in the art that other modifications may be made to the illustrated embodiments without departing from the scope of the invention as described in the specification and defined in the appended claims.

I claim:

1. A method of matching a new hole in an overlying member with an existing hole in an underlying member comprising the steps of:
   (a) placing a magnet in the existing hole;
   (b) providing in engagement with the overlying member indicator means having an internal cavity, an outer boundary, and a ferrous ball freely movable within the internal cavity;
   (c) moving the indicator means across the outer surface of the overlying member until the ferrous ball overlies the magnet means thereby locating a position on the overlying member aligned with the existing hole in the underlying member;
   (d) marking the surface of the overlying member at the intersection of the outer boundary of the indicator means with the surface of the overlying member;
   (e) removing the indicator means from the overlying member;
   (f) placing on the outer surface of the overlying member at the location marked in step (d) a drill plate such that a positioning hole therethrough has a peripheral surface coextensive with the marking on the overlying member resulting from step (d);
   (g) inserting drill guide means into the positioning hole having a central bore for the guided reception therethrough of a drill; and
   (h) using the drill guide means placed in step (g), guiding the outer peripheral surface of a drill through the central bore so that it engages the outer surface of, then cuts through, the overlying member drilling a hole through the overlying member coincident with the existing hole in the underlying member.

2. A method as set forth in claim 1 wherein step (f) includes the step of:
   (i) releasably affixing the drill plate to the underlying member.

3. A system for matching a new hole in an overlying member with an existing hole in an underlying member comprising:
   a magnet removably placed in the existing hole in the underlying member;
   indicator means responsive to said magnet for indicating, in one instance, a target location on the overlying member aligned with the existing hole in the underlying member and, in another instance, failure to determine the target location, said indicator means having a first outer boundary and central marker means being substantially equidistant from all locations of said first outer boundary, said indicator means being selectively movable across a surface of the overlying member for temporary engagement therewith;
   locating means defining the intersection of said first outer boundary with the surface of the overlying member when said central marker is aligned with said magnet; and
   drill guide means, independent of said indicator means, for selective placement on the overlying member at the target location upon removal of said indicator means from said overlying member at the target location for accurately guiding the outer peripheral surface of a drill means for drilling the new hole, said drill guide means including a body having a second outer boundary congruent with said first outer boundary and a central throughbore equidistant from all locations of said second outer boundary such that when selectively engaged with the overlying member at the target location, said second outer boundary is substantially coincident with said location means and the central throughbore therein is substantially aligned with the axis of the existing hole.

4. A system as set forth in claim 3 wherein said indicator means includes:
   a housing having an internal cavity, said first outer boundary including a first outer peripheral surface;
   ferrous ball means captured by said housing and freely movable within the internal cavity, said ferrous ball means being attracted to said magnet when said indicator means is proximate said magnet in the existing hole in the underlying member;
   biasing means on said housing for urging said ferrous indicator means toward said outer peripheral surface;
   marker means indicating a location within the internal cavity of said housing substantially equidistant from all locations of said outer peripheral surface;
   whereby, upon movement of said housing on the overlying member to a location whereat said outer peripheral surface is coincident with said locating means, said ferrous ball means overlies said marker means.

5. A system as set forth in claim 3 wherein said indicator means includes:
   a non-ferrous cylindrical wall having an upper rim, a lower rim, and an outer peripheral surface extending between said upper rim and said lower rim;
   a transparent upper plate joined to said cylindrical wall at said upper rim;
   a lower plate joined to said cylindrical wall at said lower rim;
   said cylindrical wall, said upper plate, and said lower plate together defining an internal cavity;
   ferrous ball means freely movable within the internal cavity, said ferrous ball means being attracted to said magnet when said indicator means is proximate said magnet in the existing hole in the underlying member;
   biasing means on said lower plate for urging said ferrous indicator means toward said cylindrical wall; and
   marker means on said lower plate indicating a location within the internal cavity substantially equidistant from all locations of said cylindrical wall;
   whereby, upon movement of said indicator means on the overlying member to a location whereat said outer peripheral surface is coincident with said locating means, said ferrous ball means overlies said marker means.

6. A system as set forth in claim 3 including:

a drill plate adapted to be removably fixed to the overlying member, said drill plate having a positioning hole therethrough which is substantially congruent with said indicator means and with said drill guide means and adapted to freely receive said indicator means and said drill guide means therein.

7. A system as set forth in claim 5 including:

a drill plate adapted to be removably fixed to the overlying member, said drill plate having a positioning hole therethrough which is substantially congruent with said indicator means and with said drill guide means for the free reception therein of said indicator means and of said drill guide means.

* * * * *